Aug. 1, 1933.   J. B. WEBB   1,920,774
TROLLEY FOR CONVEYER SYSTEMS
Filed Nov. 2, 1931
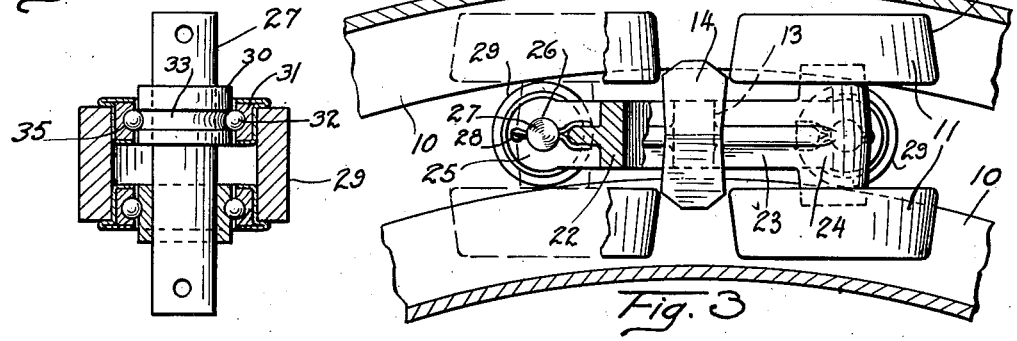
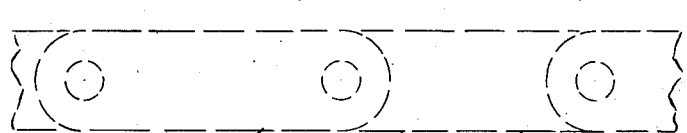
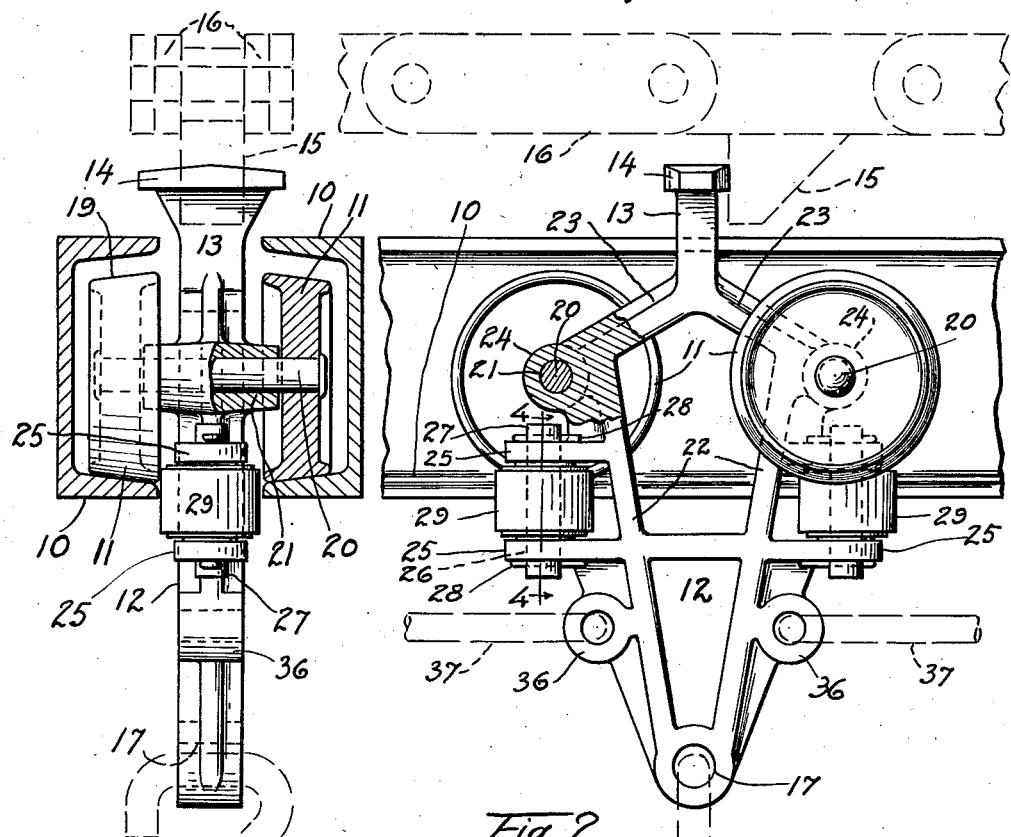
Jervis B. Webb   INVENTOR Patented Aug. 1, 1933

1,920,774

UNITED STATES PATENT OFFICE 1,920,774

TROLLEY FOR CONVEYER SYSTEMS

Jervis B. Webb, Royal Oak, Mich.

Application November 2, 1931. Serial No. 572,806

1 Claim. (Cl. 105—155)

This invention relates to a trolley device for use in connection with conveyer systems employed in modern manufacturing plants.

The principal object of the present invention is the provision of a new and improved construction for a load carrying trolley for conveyer systems of the type used in manufacturing establishments for conveyer lines.

Another object is to provide a new and improved construction in which the supporting wheels and the point of application of the propelling force are so arranged relatively to the load to be carried that tilting of the trolley on the track will be obviated and the center of gravity of the weight will be substantially, directly, vertically under the said point of application.

A further object is the provision of means for reducing undue frictional resistance and constant wear on the trolley wheels and tracks and thereby obtain a marked reduction in maintenance costs.

Another of the main objects of the invention is the elimination of the use of flanged trolley wheels and the provision of auxiliary rollers to prevent lateral movement of the trolleys relative to the tracks.

I am aware that there have been various types of trolleys used in connection with conveyer systems but heretofore it has not been the practice to simultaneously employ in one unit horizontal and vertical trolley wheels in connection with such conveyer systems. Nor has it been the practice heretofore on such systems to use wheels not having flanges. The advantages obtained by using my improved flangeless trolley wheels are readily apparent, for it is quite commonly known that on wheels having flanges, the latter not only cause considerable wear on the rails over which the wheels travel, but the flanges themselves become chipped and broken, so that both the rails and wheels must be periodically renewed, if the conveyer system is to be safely and successfully operated. It will be seen therefore that by the use of my improved device, not only will considerable saving be effected so far as maintenance costs are concerned but because of the easy, smooth and safe operation thereof, considerable trouble, annoyance, danger and delay due to worn rails and chipped flanges will be entirely obviated.

The aforementioned and other objects of the invention will appear more fully from the following more detailed description and by reference to the accompanying drawing wherein a satisfactory constructional example has been disclosed merely as illustrative of the principles of the invention and not as limiting the scope thereof, and wherein:

Fig. 1 is a front view, partly in section illustrating my complete trolley assembly.

Fig. 2 is a side elevation partly in section showing my improved device.

Fig. 3 is a top plan view of my improved device illustrating the adaptability of the same to curved trackways.

Fig. 4 is a detailed cross section of the vertical trolley, taken on the line 4—4 of Fig. 2.

As shown in the drawing, the numeral 10 indicates a conveyer track upon which is supported the flangeless wheels 11 of the article carrying trolley indicated generally by the reference character 12, the trolley 12 being provided at its upper end with an upwardly projecting extension 13, the head 14 of which is adapted to engage a depending dog 15 of a propelling or power chain 16. The lower extremity of the trolley 12 is provided with an opening 17 for the reception of an article supporting hook 18.

It will be observed that the wheels 11 are frusto conical in shape as indicated at 19, Figs. 1 and 3, the said wheels being mounted on axles 20, the members of each pair of wheels being held in proper transverse relationship upon their respective axles by means of the tubular bearing member 21.

It will be seen by referring to Fig. 2 that the frame work of the trolley 12 is substantially wedge-shaped, having a central V-shaped portion comprising the sides 22 and integral therewith an inverted Y portion comprising the aforesaid vertical member 13, head 14 and extended arms 23. At the juncture of the sides 22 and arms 23, extensions 24 are provided, the latter being bored for the reception of the axles 20. Each of the sides 22 is provided with a pair of laterally extending arms 25 that are bored at 26 for the reception of vertical axles 27, held against longitudinal movement by any suitable means such as the cotter pins 28. Interposed between the arms 25 and rotatably mounted upon the said axles are the rollers 29. Mounted between the said rollers and axles, as shown in Fig. 4, are the annular bearings 30 and 31. A plurality of anti-friction bearings, which may be of any suitable construction, but which are shown as balls 32 are interposed between the members 30 and 31. The member 30 is provided on its periphery with an annular recess 33 which forms the inner race for the balls 32 and the outer bearing member 31 is provided with a similar recess 35 on its inner periphery to form the outer race for said balls.

In conveying articles where two or more trolleys are employed I have provided the lower portion of the trolley 12 with laterally extending apertured brackets 36 for the reception of spacing bars 37, this in order to maintain a definite distance not only between the trolleys but also between the articles being conveyed, thus obviating any possibility of collisions.

The manner in which the device, as hereinbefore described, operates, is as follows:

Any well known means may be employed to operate the endless chain to which is flexibly mounted a plurality of dogs for engagement with the head or upper extremity of the trolley by which engaging means the trolley is urged along the trackway. Any number of trolleys 12 may be employed in accordance with the requirements.

As will be readily understood, my invention consists in providing a trolley composed of a framework having a plurality of horizontally and vertically disposed trolley wheels. I have accomplished this by mounting the wheels 11, on horizontal axles 20 which wheels roll on the opposed channeled trackway 10, and mounted on laterally extending arms integral with the same framework that carried the aforesaid wheels. I have placed a plurality of wheels 29 disposed on vertical axles, the latter wheels being positioned between the opposed track surfaces upon which the horizontal wheels run.

It is important here to note that the horizontal wheels 11 are not provided with flanges. Instead the treads of these wheels are of frustroconical shape so that the combination of wheels of this shape with the vertical wheels 29 interposed between the ends of the opposed trackway surfaces serves to retain the trolley in its true position upon said trackway, and consequently in the operation of the trolleys along the trackway binding and gripping by flanges on the rails is eliminated, especially on curves such as illustrated in Fig. 3. Then too, there is no danger of experiencing broken or chipped flanges. The use therefore of flangeless wheels and vertical rollers assures quiet and easy operation of the trolleys along the trackway. Another feature that adds quite appreciably to the quiet and easy operation of the trolleys is the fact that the center of gravity of the weight of my improved structure is substantially, directly, vertically underneath the point of application of the propelling force exerted, by the conveyer dogs, on the head 14 of the trolley 12.

It will be understood that the example shown in the drawing is merely illustrative and that the invention is not limited to the specific constructional details of such example but that many changes, variations and modifications may be resorted to without departing from the principles of the invention.

I claim:

A load carrying trolley assembly of the type wherein a plurality of flangeless load carrying trolley wheels mounted to rotate upon horizontal axes and supported in juxtaposition to a conveyer chain upon a pair of parallel spaced supporting tracks are maintained against excessive movement laterally to said tracks by auxiliary rollers rotating upon vertical axes and located between the opposed edges of said tracks characterized by said wheels and rollers being mounted upon a one piece frame having formed integrally therewith a pair of bearings for said trolley wheels, a pair of spaced lugs located below each of said bearings and providing bearings for the axles of said auxiliary rollers, and said frame also being provided with an upward extension midway between said trolley wheels for engagement by said conveyer chain and means for securing a load to said frame located in vertical alignment with said extension.

JERVIS B. WEBB.